United States Patent [19]
Kim

[11] Patent Number: 5,239,943
[45] Date of Patent: Aug. 31, 1993

[54] AUTOMATIC ANIMAL FEEDER

[75] Inventor: Jae H. Kim, Seoul, Rep. of Korea

[73] Assignee: Tae Lim Electronics Co., Ltd., Kyunggi-do, Japan

[21] Appl. No.: 904,954

[22] Filed: Jun. 26, 1992

[30] Foreign Application Priority Data

Jun. 5, 1992 [KR] Rep. of Korea .................. 1992-7655

[51] Int. Cl.$^5$ ................................................ A01K 5/02
[52] U.S. Cl. .................................. 119/51.12; 119/56.1
[58] Field of Search ................... 119/51.11, 51.12, 56.1

[56] References Cited

U.S. PATENT DOCUMENTS

| 4,196,697 | 4/1980 | Poiesz | 119/51.02 |
| 4,422,409 | 12/1983 | Walker et al. | 119/51.11 |
| 4,756,277 | 7/1988 | Peng | 119/51.11 |
| 4,932,361 | 6/1990 | Deutsch et al. | 119/51.12 |

FOREIGN PATENT DOCUMENTS

| 2199477 | 7/1988 | United Kingdom | 119/51.11 |
| 2214329 | 8/1989 | United Kingdom | 119/51.11 |

Primary Examiner—Robert P. Swiatek
Attorney, Agent, or Firm—Sandler Greenblum & Bernstein

[57] ABSTRACT

An animal feeder for automatically feeding animals predetermined portions of food at predetermined times and calling the animals with their owner's recorded voice when the food is fed. The animal feeder comprises a body having a food container, a food remainder receiving container and a feeding mechanism. The animal feeder also includes a microcomputer for controlling the feeding mechanism, a keyboard for setting predetermined times for feeding, and a sound producing circuit for calling the animals when the food is served. The feeding mechanism is composed of a driving section for driving a trough between a food serving position and a food remainder collecting position, and a food supplying section for supplying the food by mechanical vibration. The animal feeder further comprises a sensor for detecting an animal's approach to the body of the feeder in order to stop the operation of the feeding mechanism, for the animal's own safety, when the animal approaches the body.

19 Claims, 4 Drawing Sheets

AUTOMATIC ANIMAL FEEDER

BACKGROUND OF THE INVENTION

1. Field of the Invention

The present invention relates to an animal feeder for domestic animals such as dogs, cats, etc. and, more particularly, to an animal feeder which can automatically feed the animals predetermined portions of their food at predetermined times with calling them with their owner's voice when the food is served.

2. Description of the Prior Art

In many conventional animal feeding devices for supplying food to animals, feeding is performed only by the owner's experience and thus it is difficult to effect regular supplying of food at predetermined times. In addition, usually domestic animals are left alone when the family leave the house for work, vacation or school are provided with their food, as much as they can enjoy, for the day or even the weekend or more, while some of them are taken care of by pet shelters or others.

Various animal feeders for delivering predetermined portions of food at regular intervals have been known. However, they have been expensive to manufacture due to their complicated structure and are difficult to maintain.

SUMMARY OF THE INVENTION

A principal object of the present invention is to provide an improved animal feeder which can automatically supply dry food by predetermined quantities at predetermined intervals.

Another object of the present invention is to provide an automatic animal feeder which can notify the feeding to the animals with their owner's calling voice when the food is served.

Still another object of the present invention is to provide an animal feeder which can automatically collect the remaining food when a predetermined time has lapsed after completion of feeding.

According to one aspect of the present invention, there is provided an automatic animal feeder comprising:

a body provided with a food container and a feeding mechanism;

a microcomputer for controlling the feeding mechanism as a system controller;

a keyboard for setting predetermined times for feeding and for selecting functions of the feeder;

means for producing a sound depending on a reproducing command from the microcomputer; and display means for displaying the present time, the predetermined times and the operating state of the feeder under the control of the microcomputer.

Preferably, the feeding mechanism comprises:

driving means for performing a mechanical operation of feeding mechanism depending on a food supplying command and a remainder collecting command from the microcomputer, the food supplying command being synchronized with the reproducing command; and food supplying means for supplying the food by mechanical vibration under the control of the microcomputer.

More preferably, the animal feeder may include sensing means for detecting the animal's approach to the body of the feeder in order to stop the operation of the feeding mechanism by the control of the microcomputer when the animal approaches the body.

In another aspect according to the present invention, there is provided a method for controlling an animal feeder, comprising the steps of:

waiting for a first preset time until the respective predetermined time setting signals are entered through a keyboard after the present time is set;

performing a counting operation, after comparing the counted value produced by a timer with a preset value when the counted value does not coincide with the preset value, or changing the present time when the counted value coincides with the preset value;

thereafter checking whether the present time coincides with the predetermined time or not;

feeding the food with producing a sound and waiting for a second preset time when the present time coincides with the predetermined time; and rotating a trough and collecting the food remainder when the second preset time elapses.

BRIEF DESCRIPTION OF THE DRAWINGS

The present invention will now be described by way of illustrative examples with reference to the accompanying drawings, in which.

DETAILED DESCRIPTION OF THE PREFERRED EMBODIMENTS

Figure 1:
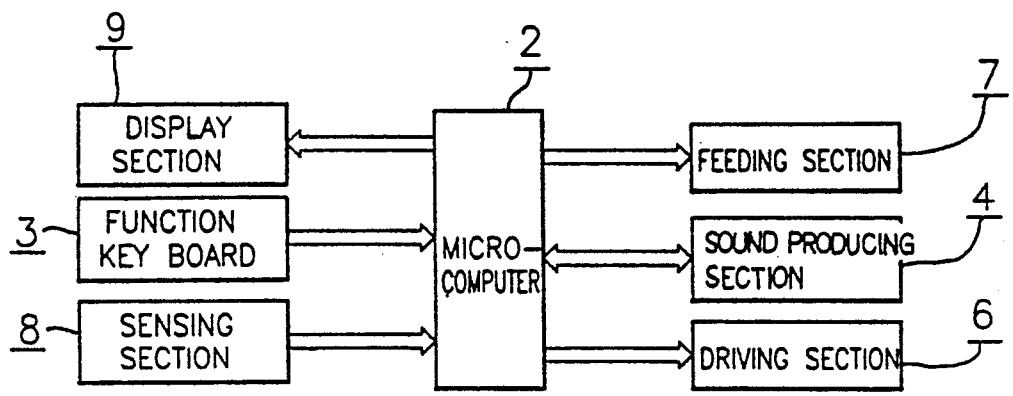
FIG. 1 is a block diagram of the animal feeder structure according to the present invention.
Figure 2:
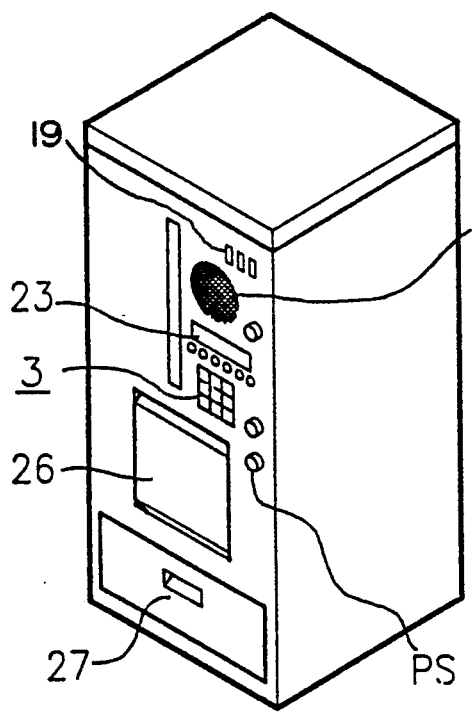
FIGS. 2A and 2B are perspective views showing the embodiments of the feeding mechanism according to the present invention.
Figure 2:
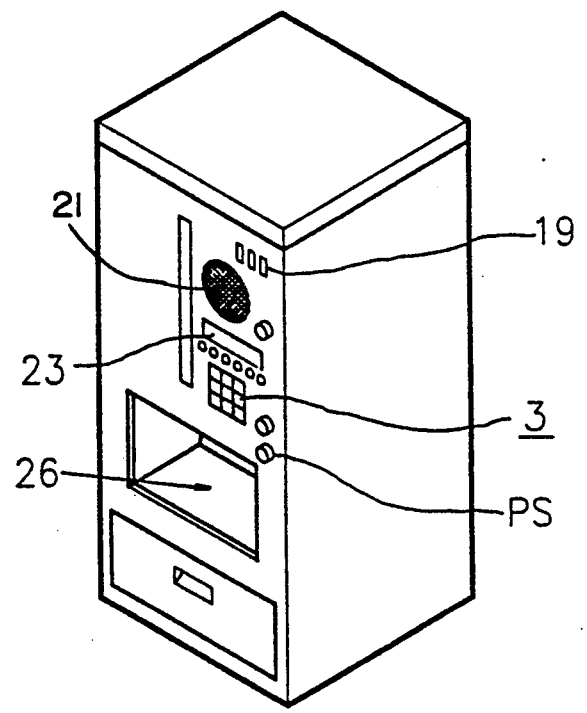
Figure 3:
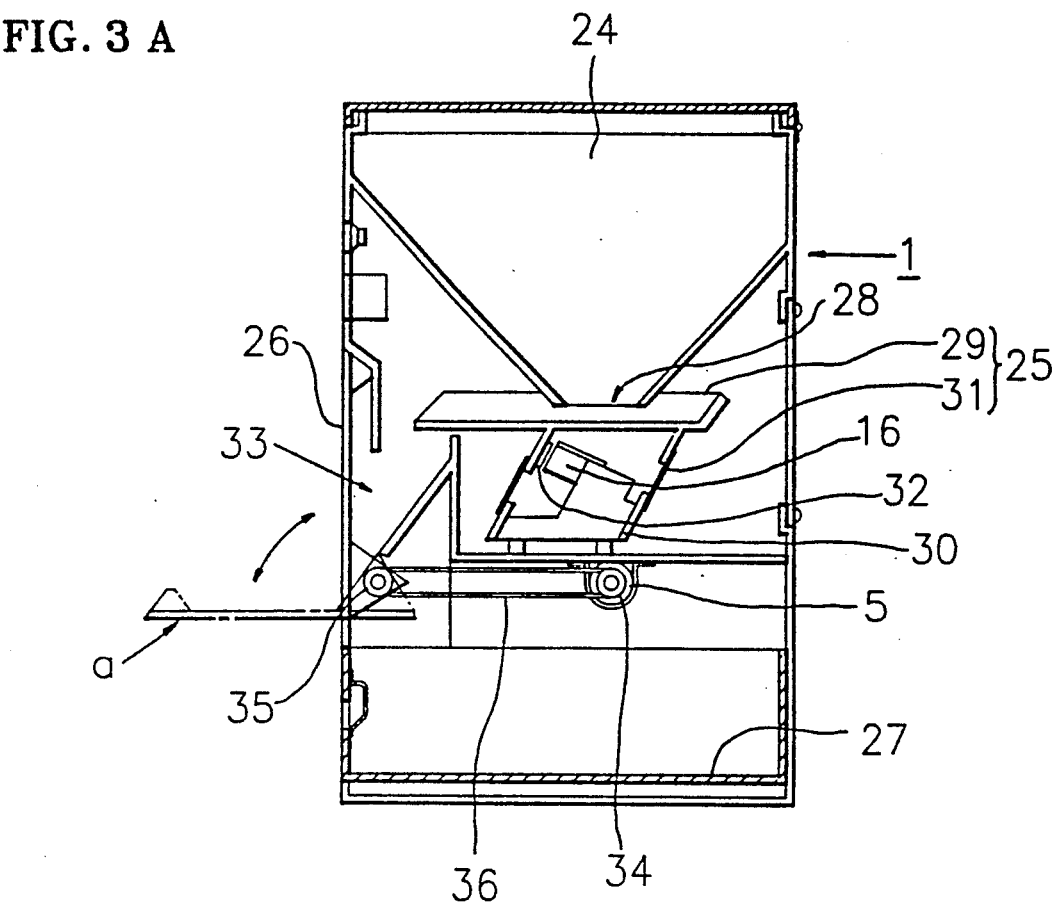
FIGS. 3A and 3B are cross sectional views of the embodiments of FIGS. 2A and 2B, respectively.
Figure 3:
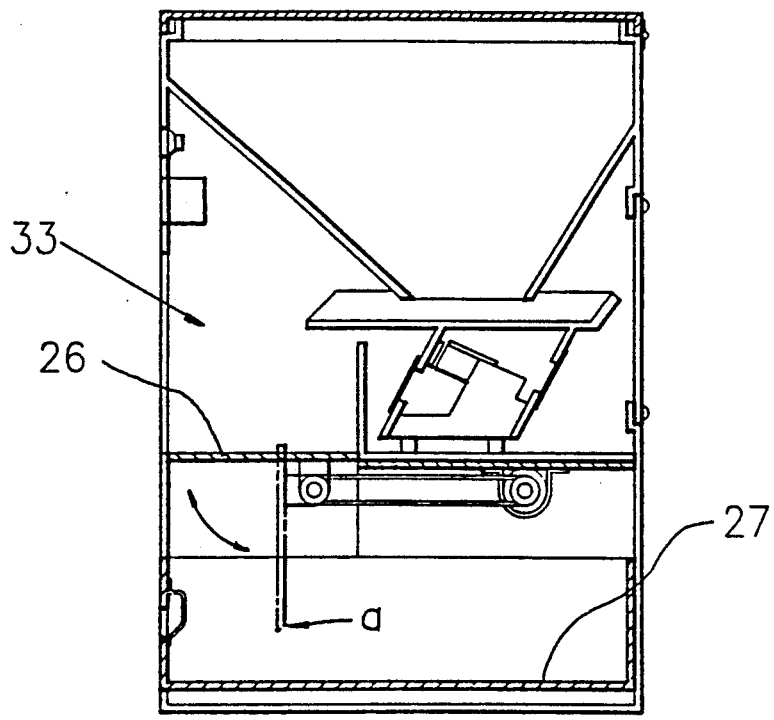

The preferred embodiments of the present invention are shown in the accompanying drawings. Referring to FIGS. 1 through 5, the feeder has a body 1 incorporating a food container 24 and a feeding mechanism, a microcomputer 2 which controlls the feeding mechanism as a system controller, a keyboard 3 for setting the functions of the feeder and the predetermined times for feeding, a sound producing section 4 for encoding and storing the owner's calling voice as a digital code, and then decoding and reproducing the stored signal as the owner's calling voice when the reproducing command is produced by the microcomputer 2, and a display section 9 for displaying the operating state of the feeder, the present time and the present times under the control of the microcomputer 2.

In the embodiment, the feeding mechanism comprises a food supplying section 7 for supplying dry food by mechanical vibration under the control of the microcomputer 2, and a driving section 6 for performing mechanical operation of the feeding mechanism at the same time when the owner's voice is reproduced by the voice recording/reproducing section 4.

In the embodiment, a sensing section 8 may be provided for detecting the animal's approach to the body 1 and for stopping the operation of the feeding mechanism and a pivotable plate-shaped trough 26 when the animal approaches the body 1 to protect the animal's body or a part of it, such as the head or the legs of the animal, from being injured and/or jammed.

The driving section 6 includes a motor 5, motor driving transistor $TR_1$ to $TR_6$, diodes $D_1$ to $D_4$ for preventing a reverse voltage and bias resistor $R_1$ to $R_9$. The polarity of the motor driving voltage to be supplied to the motor 5 is changed under the control of the microcomputer 2 so as to change rotating direction of the motor 5.

The food supplying section 7 includes a timer 11 that receives the food supplying command from the microcomputer 2, a DIP switch 12 which has contacts $S_1$ to $S_4$ for selecting the time constant of the timer 11 together with resistors $R_{13}$ to $R_{17}$, and a capacitor $C_9$. A relay RL is provided that is driven by the output of the timer 11 via a relay driving transistor $TR_7$. A vibrator including an electromagnet 16 and a control circuit receiving the AC power supply through a relay switch 13 of the relay RL and producing an intermittent current to the electromagnet 16 for mechanical vibration of a vibrating plate 31 is also provided. The control circuit includes a SCR 14 whose anode and cathode are coupled to the AC power supply and the electromagnet 16, respectively, a variable resistor $VR_1$ for presetting the vibrating power, and a Zener diode 15 connected between the variable resistor $VR_1$ and the gate of the SCR 14.

The sound producing section 4 comprises a voice recording/reproducing IC 17 for encoding the owner's calling voice into a digital code depending on a record control signal from the microcomputer 2 and decoding the digital code of the owner's calling voice depending on the reproducing command from the microcomputer 2. A microphone 19 for entering the owner's calling voice to the IC 17; a RAM 18 for storing the digital code encoded by the IC 17, an operational amplifier 20 for amplifying the output of the IC 17, and a speaker 21 for outputting the owner's calling voice are also provided.

As an alternative, the sound producing section 4 may also be a magnetic tape recording and/or reproducing circuit or a reproducing circuit utilizing a melody IC.

The display section 9 includes a clock display board 23 connected to the microcomputer 2. The keyboard 3 has a plurality of function keys and time setting keys connected to the microcomputer 2 for entering various setting times and functions such as ON/OFF operation of the feeder, recording of the owner's calling voice, setting of predetermined times for feeding, etc.

Referring again to FIGS. 2A, 2B and 3A, 3B, the body 1 is provided with a food container 24 and a remainder receiving container 27 disposed at the lowest portion of the body 1 and for collecting the food remainder. Food supplying members 25 are disposed below the food container 24. Plate-shaped trough 26 is provided for serving the animal with the dry food delivered by the food supplying members 25, and is rotated by means of the motor 5.

The food container 24 is disposed at the upper interior space of the body 1 and provided with an outlet 28. The food supplying members 25 are composed of a guide plate 29 arranged below the outlet 28, a supporter 30, and a permanent magnet 32 which is fixedly disposed opposite to the electromagnet 16 for mechanical vibration of a vibrating plate 31 fixed to the supporter 30.

Referring to FIGS. 3A and 3B, the trough 26 may be vertically mounted so as to open or close the opening 33, or may be horizontally mounted so as to provide the bottom part inside the opening 33.

The driving section 6 is also composed of a pulley 34 which is connected to the driving shaft of the motor 5, a pulley 35 mounted on one side of the plate-shaped trough 26 and a driving belt 36 coupling two pulleys 34 and 35.

Now, the operation of the feeding apparatus according to the present invention will be described in detail.

Figure 5:
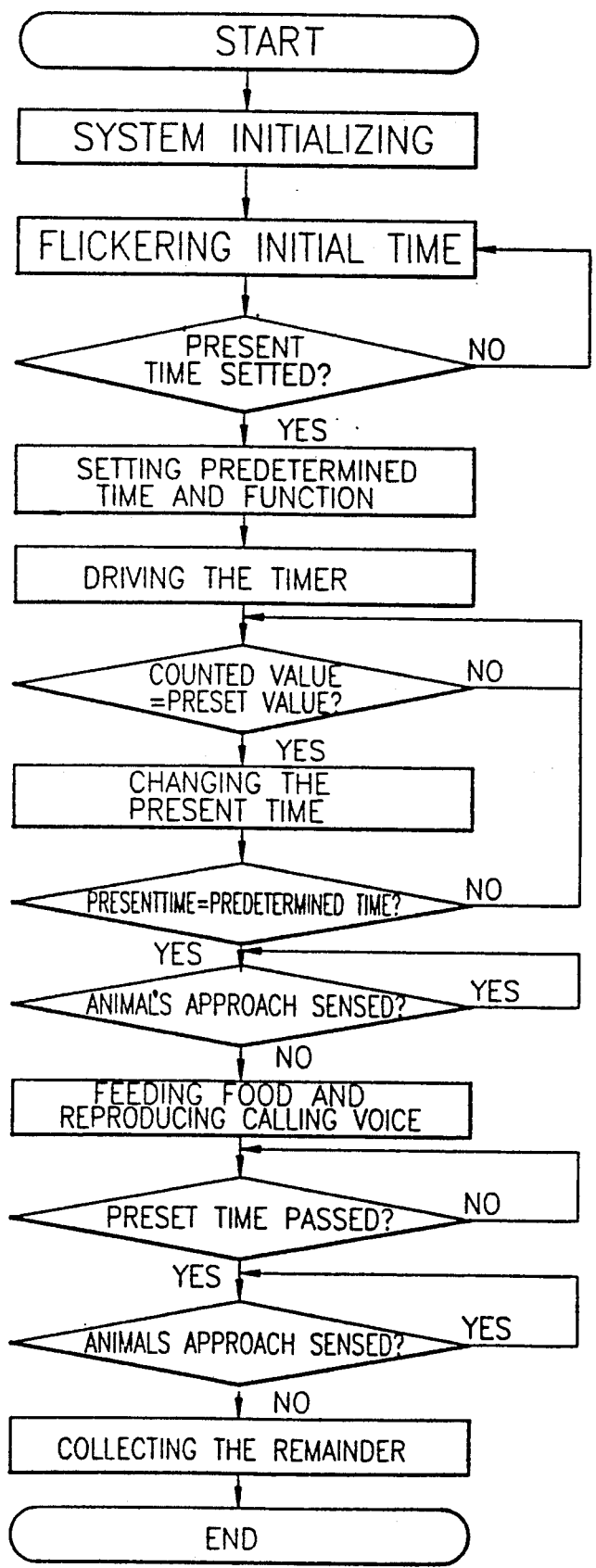
FIG. 5 is a flow chart illustrating the operation of the feeder according to the present invention.

Referring to FIG. 5, when the AC power supply is applied to the feeding system, the microcomputer 2 initializes the system and the initial time is displayed in a flickering state on the clock display board 23 by the control of the microcomputer 2 through a latch 22. The user may set the present time at this stage.

Figure 4:
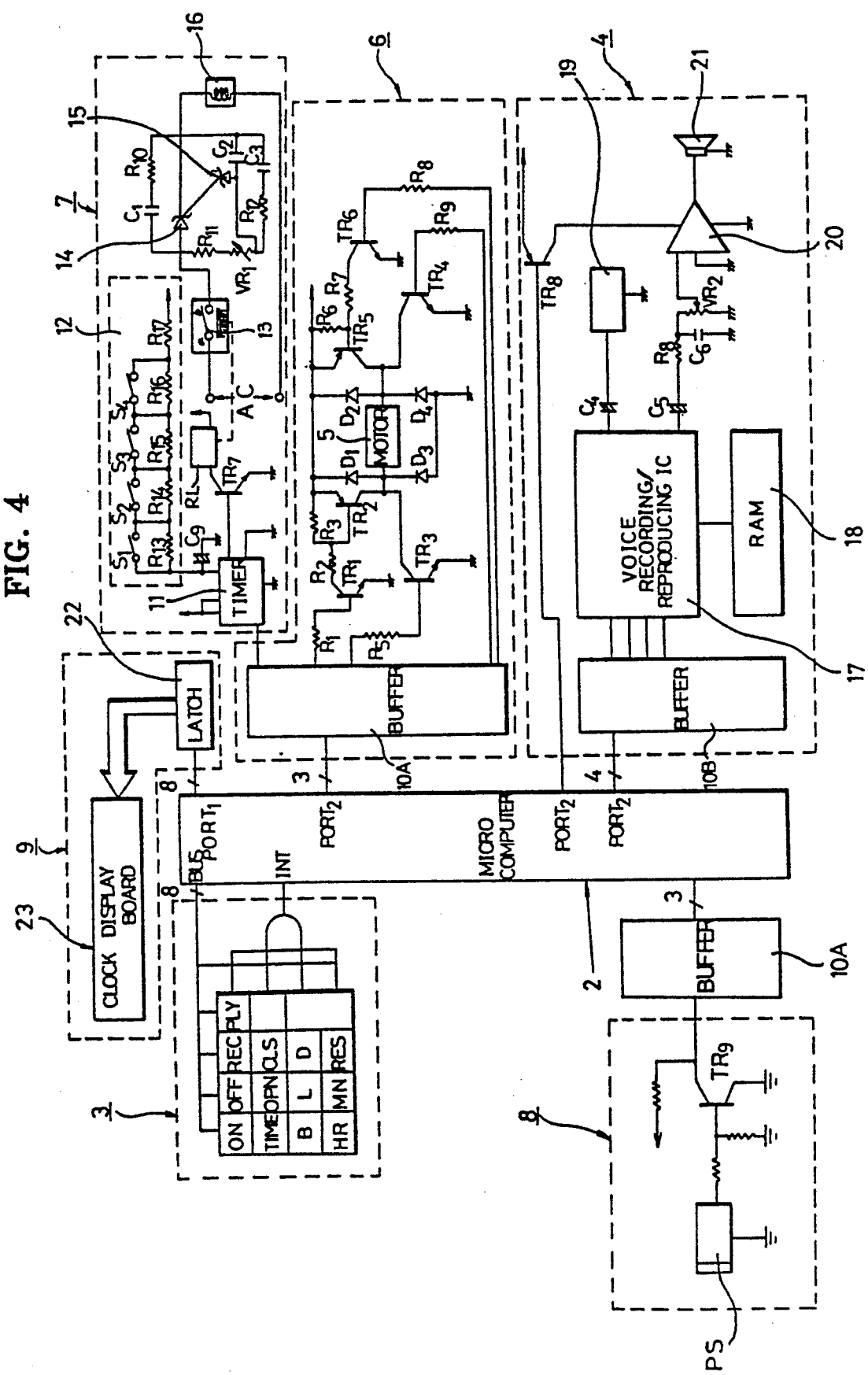
FIG. 4 is a circuit diagram of the animal feeder according to the present invention.

As shown in FIGS. 4 and 5, the microcomputer 2 checks whether a time setting key TIME in the keyboard 3 is entered or not.

If the time setting key TIME is not entered, the clock display board 23 continues to flicker, whereas if the time setting key is entered, the flickering state on the clock display board 23 is stopped by the control of the microcomputer 2. At this time, the microcomputer 2 waits for the input of an hour setting key HR and a minute setting key MN for about 5 seconds. When the hour setting key HR and the minute setting key MN are entered, the clock display board 23 indicates the corresponding time as the present time.

Thereafter, the user may set a predetermined time. For example, setting a first predetermined time for a morning meal can be completed by entering the time setting key TIME, the hour setting key HR, the minute setting key MN, and then a first predetermined time setting key B, resulting in that data being stored in the microcomputer 2. Setting of a second predetermined time for an afternoon meal or a third predetermined time for an evening meal can also be completed by the same manner as described above, using second or third predetermined time setting key L or D.

Keys OPN and CLS may be selectively entered by the user when the user wants to manually supply the food and to manually collect the food remainder independently of any setting of any predetermined time.

Further, a recording key REC enables the user to record his calling voice by means of a microphone 19 disposed on the front wall of the body 1. When the recording key REC is entered, the microcomputer 2 recognizes this and outputs a recording control signal to the voice recording/reproducing IC 17, through a buffer 10B. Thus the user's calling voice from the microphone 19 is applied to the voice recording and reproducing IC 17, encoded into a digital code, and then stored in the RAM 18.

When the predetermined time is set in the above described manner, the microcomputer 2 performs a counting operation by driving a built-in timer (not illustrated) therein, and then compares the counted value with a preset value, for example, 1 minute in the embodiment. If the counted value does not reach 1 minute, the microcomputer 2 keeps performing the counting operation. If the counted value reaches 1 minute, the microcomputer 2 changes the present time and outputs such data to the clock display board 23 through the latch 22. Thus the present time to be displayed on the clock display board 23 can be successively changed as in the above manner.

Thereafter, the microcomputer 2 compares the present time with the predetermined time previously set by the user. If the present time does not coincide with the predetermined time, the microcomputer 2 keeps performing the counting operation as described above. When the present time comes to coincide with the predetermined time, the microcomputer 2 checks whether any animal has approached the body 1, depending on the output of a photo sensor PS in the sensing section 8.

If no animal is recognized to be near the body 1, the microcomputer 2 then outputs a reproducing command to the voice recording/reproducing section 4 and a food supplying command to the motor driving section 6 and the food supplying section 7 respectively.

When the reproducing command from the microcomputer 2 is applied to the voice recording/reproducing section 4, the voice recording/reproducing IC 17 decodes the digital signal stored in the RAM 18 and thus the reproduced calling voice is outputted through the speaker 21 by means of the variable resistor $VR_2$ for volume control and the operational amplifier 20.

At the same time, the motor 5 in the driving section 6 is rotated clockwise according to the food supplying command from the microcomputer 2, making the plate-shaped trough 26 to be pivoted to the position shown as the phantom line "a" in FIG. 3A.

Also, when the food supplying command is applied to the food supplying section 7, the timer 11 is driven and outputs a control signal having a time constant determined by the DIP switch 12 to the relay driving transistor $TR_7$, making the transistor $TR_7$ to be turned ON.

The DIP switch 12 has contacts $S_1$ to $S_4$ which may be selectively turned ON or OFF by the user. For example, if the contacts $S_1$ and $S_2$ are in ON state, the time constant of the timer 11 is determined by the resistors $R_{15}$ to $R_{17}$ and the capacitor $C_9$, and this causes the driving time of the timer 11 to be determined accordingly. In the embodiment, as the number of the contacts of the DIP switch 12 which are in ON state increases, the corresponding value of the time constant of the timer 11 decreases, resulting in that the time constant of the timer 11 may be increased or decreased according to the ON/OFF state of the contacts $S_1$ to $S_4$ of the DIP switch 12.

When the transistor $TR_7$ is turned ON as described above, the relay RL is energized, its relay switch 13 becomes in ON state, and then the AC power supply is applied to the control circuit through the relay switch 13. Thus, the Zener diode 15 is turned ON during a positive half period of the AC power supply which is applied thereto through the variable resistor VR, so that the SCR 14 is triggered and turned ON with the AC power supply being applied to the electromagnet 16 through the SCR 14.

Accordingly, a magnetic field is formed around the electromagnet 16 by the induced electric current, so that the permanent magnet 32 can be pulled. However, the Zener diode 15 is turned OFF during a negative half period of the AC power supply and thus the SCR 14 is not triggered and turned OFF, so that the electromagnet 16 is in a de-energized state, thereby releasing the permanent magnet 32 which has been loaded by the pulling force.

As such actions are repeated, the vibrating plate 31 performs a mechanical vibration, with the result that the food provided from the guide plate 29 fixed on the vibrating plate 31 through the outlet 28 of the food container 24 is delivered along the guide plate 29 and dropped on the plate-shaped trough 26. Such feeding operation continues during the driving time of the timer 11 and thus the quantity of food to be fed can be determined by selecting the contacts $S_1$ to $S_4$ of the DIP switch 12.

When a preset time, for example, 1 hour in the embodiment, is passed over after completion of feeding, the microcomputer 2 checks again if the animal is near the body 1 by means of the sensing section 8. If so, the microcomputer 2 keeps on checking, whereas if not, the microcomputer 2 then outputs a remainder collecting command to the driving section 6, so that the motor 5 is rotated counterclockwise and makes the plate-shaped trough 26 return to its original position with the food remaining on the trough 26 being dropped and collected in the remainder receiving container 27.

Referring to FIG. 3B, another embodiment of the feeding mechanism is shown. In this embodiment, an opening 33 for the entrance of the animal's head is provided in the front of the feeder and the plate-shaped trough 26 is disposed inside the opening 33. The plate-shaped trough 26 is pivoted to the position shown as the phantom line "a" in FIG. 3B, after completion of feeding, in order to collect the food remaining on the trough in the remainder receiving container 27.

Further feeding operation can also be performed by setting the second and/or third predetermined time(s) in the same manner as described above.

From the foregoing, it will be apparent that the present invention provides an advantage that it is not necessary for the domestic animals to be taken care of by pet shelters or others even when they are left alone for a long time, since the animal feeder of the invention can automatically feed animals predetermined portions of food at predetermined times by calling them with their owner's calling voice.

While the present invention has been described and illustrated herein with reference to the preferred embodiments thereof, it will be understood by those skilled in the art that various changes in form and details may be made therein without departing from the spirit and scope of the invention.

What is claimed is:

1. An animal feeder comprising:
    a body provided with a food container, a feeding mechanism, and a pivotable feeding trough for receiving food stored in said container and fed by said feeding mechanism, said pivotable feeding trough being positioned such that an animal may feed on food contained therein and being pivoted in order to collect remaining food from said trough;
    a microcomputer for controlling the operation of said feeding mechanism and said feeding trough;
    a keyboard for setting predetermined times for feeding and selecting functions of said feeder;
    means for audibly producing a stored message in accordance with a reproducing command from said microcomputer; and
    display means for displaying the present time, said predetermined feeding times and an operation state of said feeder controlled by said microcomputer,
    said feeding mechanism comprising means for performing feeding operations of said feeding mechanism in accordance with a food supplying command and a food remainder collecting command from said microcomputer, said food supplying command being synchronized with said reproducing command from said microcomputer, and food supplying means for supplying the food contained in said food container by mechanical vibration in accordance with said food supplying command from said microcomputer.

2. An animal feeder according to claim 1, further comprising sensing means for detecting an animal's approach to said body in order to stop the operation of said feeding mechanism and said pivotable feeding trough, when the animal approaches said body, by the control of said microcomputer and to protect the animal's body or a part of the animal's body from being injured or jammed.

3. An animal feeder according to claim 1, wherein said body further comprises a food remainder receiving container disposed at the bottom of said body.

4. An animal feeder according to claim 1, wherein said means for performing feeding operations of said feeding mechanism comprises a motor for operating said trough to be pivoted, and motor driving control means for driving said motor to be rotated clockwise or counterclockwise depending on said food supply command or said food remainder collecting command from said microcomputer, respectively, so that said trough is pivoted between a food serving position and a food remainder collecting position, respectively.

5. An animal feeder according to claim 1, wherein said food supplying means comprises a mechanical vibrator utilizing an electromagnet, control means for controlling the operation of said mechanical vibrator in accordance with said food supplying command from said microcomputer, and guide means for guiding the food provided in said food container to said trough, said guide means being vibrated by said mechanical vibrator.

6. An animal feeder according to claim 5, wherein said control means comprises a timer driven by said food supplying command from said microcomputer, a driving circuit which is controlled in accordance with the output of said timer and drives said electromagnet by producing an intermittent current to said electromagnet for the operation of said mechanical vibrator, and a timing circuit having means for selecting various time constants of said timer so that various periods of the driving time of said timer are selected for determining the portions of the food to be fed.

7. An animal feeder according to claim 1, wherein said sound producing means comprises a voice recording/reproducing IC for encoding an audible message into digital code in accordance with a recording control signal from said microcomputer and for decoding said digital code of said message in accordance with said reproducing command from said microcomputer, a microphone for inputting said audible message to said voice recording/reproducing IC, a memory for storing said digital code encoded by said voice recording/reproducing IC, an amplifier for amplifying the output of said voice recording/reproducing IC and a speaker for outputting said reproduced message.

8. An animal feeder according to claim 1, wherein said audible message producing means is a magnetic tape recording/reproducing circuit which reproduces the message depending on said reproducing command from said microcomputer.

9. An animal feeder according to claim 1, wherein said audible message producing means is a sound reproducing circuit utilizing a melody IC which reproduces the message depending on said reproducing command from said microcomputer.

10. A method for automatically feeding an animal with an animal feeder, said animal feeder including input means for inputting time setting signals for feeding and setting the present time, a food container for storing food, and a trough for receiving food stored in the food container, comprising the steps of:
  waiting a first preset time until predetermined time setting signals for feeding are entered through the input means after the present time is set;
  successively performing a counting operation, after comparing the counted value produced by a timer with a preset value, when the counted value does not coincide with the preset value;
  changing the present time when the counted value coincides with the preset value;
  thereafter checking whether the present time coincides with the predetermined time;
  feeding food stored in the food container to the trough and producing an audible message for calling the animal;
  waiting a second preset time when the present time coincides with the predetermined time; and
  rotating the trough and collecting the remaining food after the second preset time elapses.

11. A method of claim 10, wherein the audible message for calling the animal is the animal owner's calling voice.

12. An animal feeder for automatically feeding an animal predetermined portions of food at predetermined feeding times, comprising:
  a food container for storing food;
  a feeding mechanism for feeding the food stored in said food container to a pivotable feeding trough, said trough being positioned such that an animal may feed on food contained therein;
  means for setting a plurality of predetermined feeding times; and
  means for controlling a feeding operation of said feeding mechanism and a pivotable motion of said trough in accordance with said predetermined feeding times set by said setting means,
  said feeding mechanism comprising means for performing feeding operations of said feeding mechanism in accordance with a food supplying command and a food remainder collecting command from said control means, and food supplying means for supplying the food contained in said food container by mechanical vibration in accordance with said food supplying command from said control means.

13. An animal feeder according to claim 12, further comprising means for audibly reproducing a stored message in accordance with a reproducing command from said control means.

14. An animal feeder according to claim 13, wherein said stored message is the animal owner's calling voice.

15. An animal feeder according to claim 13, wherein said reproducing command is issued by said control means during the feeding operation of said feeding mechanism.

16. An animal feeder according to claim 12, further comprising means for detecting an animal's approach to the feeder, said control means stopping the feeding of the food into said trough, by said feeding mechanism when said detecting means detects the animal's approach.

17. An animal feeder according to claim 12, further comprising means for collecting food remaining in said trough into a food remainder receiving container in accordance with said food remainder collecting command from said control means.

18. An animal feeder according to claim 17, wherein said remainder collecting command is issued from said control means after a predetermined time has passed since a completion of the feeding operation by said feeding mechanism and the animal's presence is not detected by said detecting means.

19. An animal feeder according to claim 12, wherein said feeding mechanism includes a vibrating guide plate for vibratingly guiding food stored in said food container into said trough during the feeding operation.

* * * * *